(12) United States Patent
Chang

(10) Patent No.: US 6,952,833 B2
(45) Date of Patent: Oct. 4, 2005

(54) LOW NOISE OPTICAL DISK DRIVE

(75) Inventor: Chih-Wei Chang, Taipei Hsien (TW)

(73) Assignee: Micro-Star Int'l Co., Ltd., Jung-He (TW)

( * ) Notice: Subject to any disclaimer, the term of this patent is extended or adjusted under 35 U.S.C. 154(b) by 132 days.

(21) Appl. No.: 10/250,252

(22) Filed: Jun. 18, 2003

(65) Prior Publication Data

US 2004/0163093 A1 Aug. 19, 2004

(30) Foreign Application Priority Data

Feb. 14, 2003 (TW) ........................................ 92202414 U

(51) Int. Cl.[7] ........................... G11B 33/14; G11B 17/00
(52) U.S. Cl. .................................... 720/648; 360/97.01
(58) Field of Search ............. 720/648; 360/97.01–97.04

(56) References Cited

U.S. PATENT DOCUMENTS

| | | | | |
|---|---|---|---|---|
| 5,907,453 | A | * 5/1999 | Wood et al. .............. | 360/97.02 |
| 6,307,715 | B1 | * 10/2001 | Berding et al. .......... | 360/244.8 |
| 6,400,524 | B1 | * 6/2002 | Morris et al. ............ | 360/97.01 |
| 6,473,263 | B2 | * 10/2002 | Jang et al. ................ | 360/97.01 |
| 6,496,326 | B1 | * 12/2002 | Boutaghou ............... | 360/97.03 |
| 6,498,700 | B2 | * 12/2002 | Takahashi et al. ........ | 360/97.01 |
| 6,724,566 | B2 | * 4/2004 | Kant et al. ............... | 360/97.01 |
| 2001/0028527 | A1 | * 10/2001 | Bae et al. ................. | 360/97.02 |

* cited by examiner

Primary Examiner—Allen Cao
(74) Attorney, Agent, or Firm—Winston Hsu

(57) ABSTRACT

A low noise optical disk drive includes a top cover, a bottom base, a containing space defined between the top cover and the bottom base, a playing mechanism assembled in the containing space, and a noise absorbing device installed in the containing space. When the playing mechanism is holding the CD ROM and in an operating state, the rotation of the CD ROM generates a main air current within the containing space and therefore produces noise. The noise absorbing device is capable of absorbing the mechanical noise when the playing mechanism is in the operating state, as well, when the main air current flows through the noise absorbing device, the main air current is divided into a plurality of air currents of different directions so as to reduce the noise produced from the main air current.

6 Claims, 6 Drawing Sheets

|  | Top | Front | Rear |
|---|---|---|---|
| MS-8152 52X CD-ROM Prior art CD Rom drive | 50.2 | 48.4 | 50 |
| Low noise CD Rom drive of the present invention | 48.1 | 46.5 | 48.3 |

Fig. 6

LOW NOISE OPTICAL DISK DRIVE

BACKGROUND OF INVENTION

1. Field of the Invention

The invention relates to anOptical disk drive, and more particularly, to anOptical disk drive is capable of reducing mechanical noise and noise due to air currents.

2. Description of the Prior Art

An optical disk drive is presently standard equipment of a computer, like CD ROM, DVD ROM and CD RW drives, for example reading speed of CD ROM drive has quickly developed from a low rotation rate (low reading speed) of 2×, 4× to a high rotation rate (high reading speed) of 52×. As well, the rotation rate of CD ROM exceeds 10,000 rpm for satisfying users" demand of data reading speed. Because of the high rotation rate, when the CD ROM drive operates, its components, such as a spindle motor, a track seeking motor, a reading probe and a gear wheel, will generate mechanical noise. Similarly, the high rotation rate of CD ROM itself will cause internal air currents and therefore produce a high decibel noise level.

Referring to FIG. 1 and FIG. 2, a prior art CD ROM drive 1 comprises a bottom base 11, a top cover 12 coupling to the bottom base 11, and a playing mechanism 14 positioned in a containing space 13 defined between the top cover 12 and the bottom base 11. The playing mechanism 14 is capable of being drawn out for holding a disk 16 so as to read and/or write data.

A space distance between the top of playing mechanism 14 and the inner surface 121 of the top cover 12 is narrow, therefore, when an air current 100 around the disk 16 is moved out by centrifugal force, there are no sufficient air currents for supply, which produces an unstable atmospheric field. Consequently, the disk 16 is vibrated and its reading accuracy is affected, and a wind shear caused by the flow of air current 100 will also generate noise. When additionally considering the mechanical noise generated by the operation of playing mechanism 14, the total noise of CD ROM drive 1 will be more serious.

A method of reducing noise of the prior art CD ROM drive 1 is sticking one or more sound absorbing strips formed of a high polymer foaming material, such as a rubber foaming material or a polyurethane foaming material, on the inner surfaces of the top cover 12 or the bottom base 11 for filling the gap between the top cover 12 and the playing mechanism 14 or filling the gap between bottom base 11 and the playing mechanism 14 so as to avoid noise spreading out the CD ROM drive 1. However, the noise produced from the wind shear caused by the flow of the air current 100 cannot be effectively reduced.

Therefore, how to improve the mechanical noise and the noise due to air current of the CD ROM drive 1 is currently one of the most important issues.

SUMMARY OF INVENTION

It is therefore an objective of the present invention to provide a CD ROM drive comprising a noise absorbing device, which is capable of absorbing the noise generated by the rotation of the disk and dividing the air current caused by the rotation of the disk for further reducing the noise.

It is another objective of the present invention to use the material forming the noise absorbing device to absorb the mechanical noise when the CD ROM drive is operating so as to avoid the mechanical noise spreading out of the CD ROM drive.

According to the present invention, a low noise CD ROM drive comprises a top cover, a bottom base, a containing space defined between the top cover and the bottom base, a playing mechanism assembled in the containing space, and a noise absorbing device installed in the containing space. When the playing mechanism is holding the disk and in an operating state, the rotation of the disk generates a main air current within the containing space and therefore produces noise. The noise absorbing device is capable of absorbing the mechanical noise when the playing mechanism is in the operating state. As well, when the main air current flows through the noise absorbing device, the main air current is divided into a plurality of air currents of different directions so as to reduce the noise produced from the main air current.

These and other objects of the present invention will be apparent to those of ordinary skill in the art after reading the following detailed description of the preferred embodiments, which are illustrated in the multiple figures and drawings.

BRIEF DESCRIPTION OF DRAWINGS

FIG. 6 is a table of experimental data indicating the noise level of comparing the low noise CD ROM drive according to the present invention with the prior art CD ROM drive.

DETAILED DESCRIPTION

For clearly showing the present invention, similar components are indicated by the same reference numbers in the following description.

Figure 1:
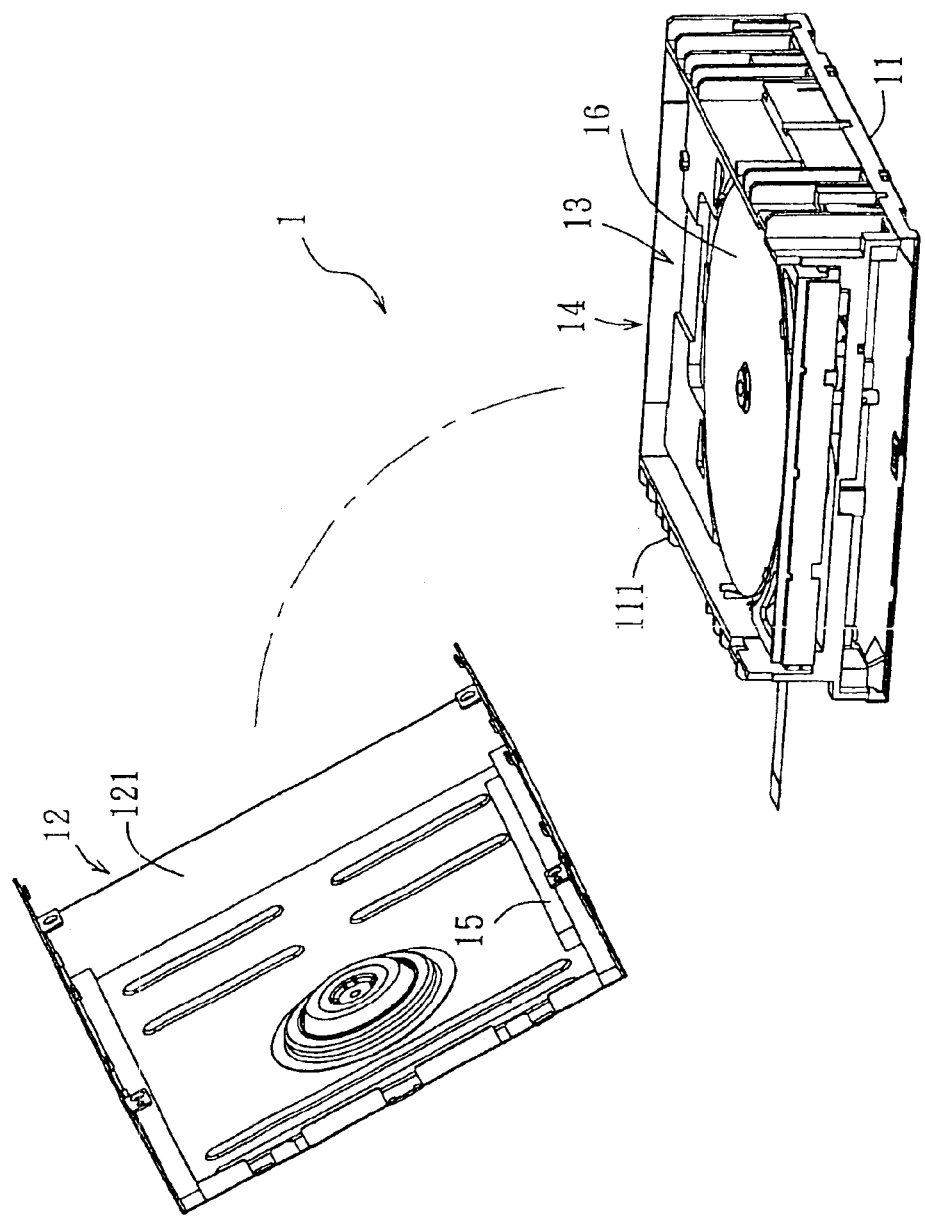
FIG. 1 is a structural diagram of a prior art CD ROM drive.
Figure 2:
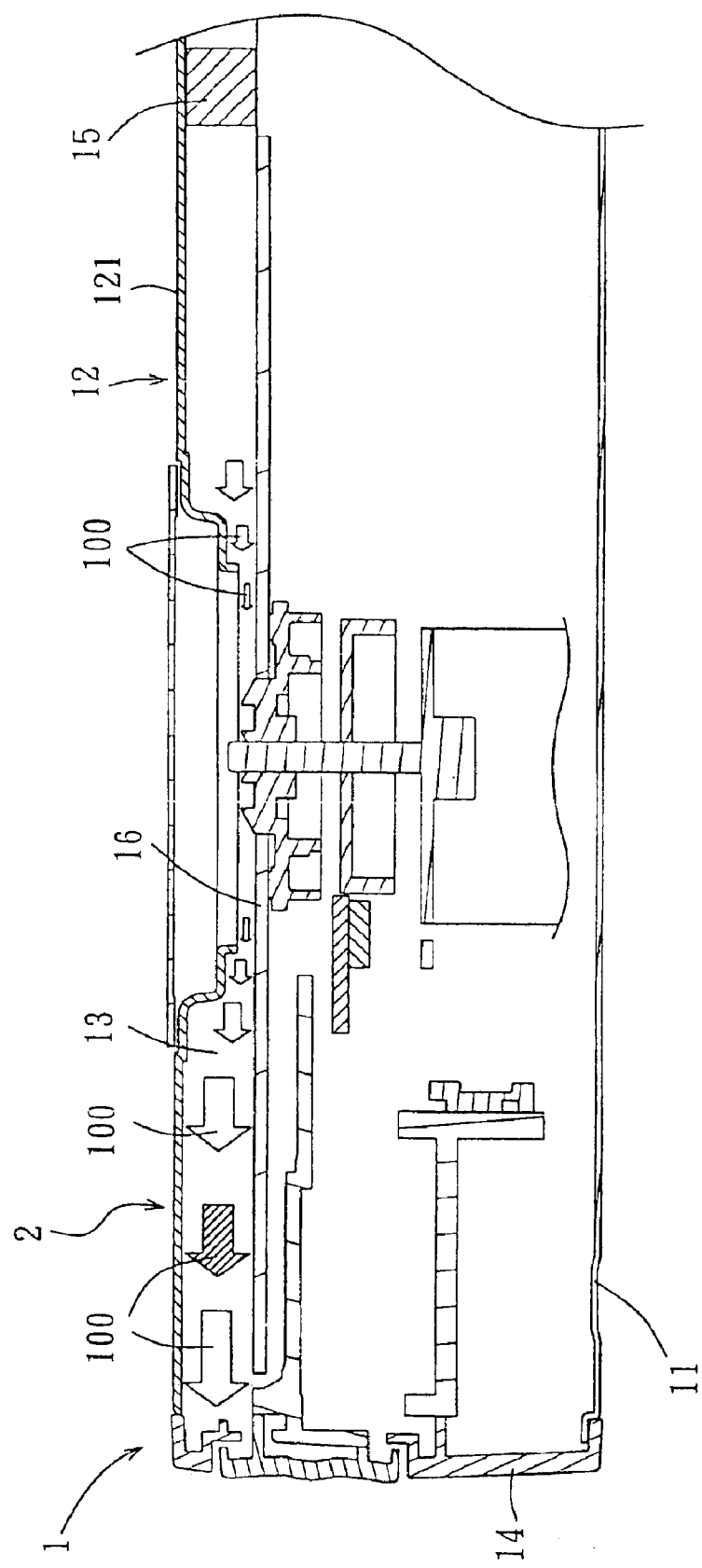
FIG. 2 is an end view of FIG. 1 showing the direction of air currents when the CD ROM drive is operating.
Figure 3:
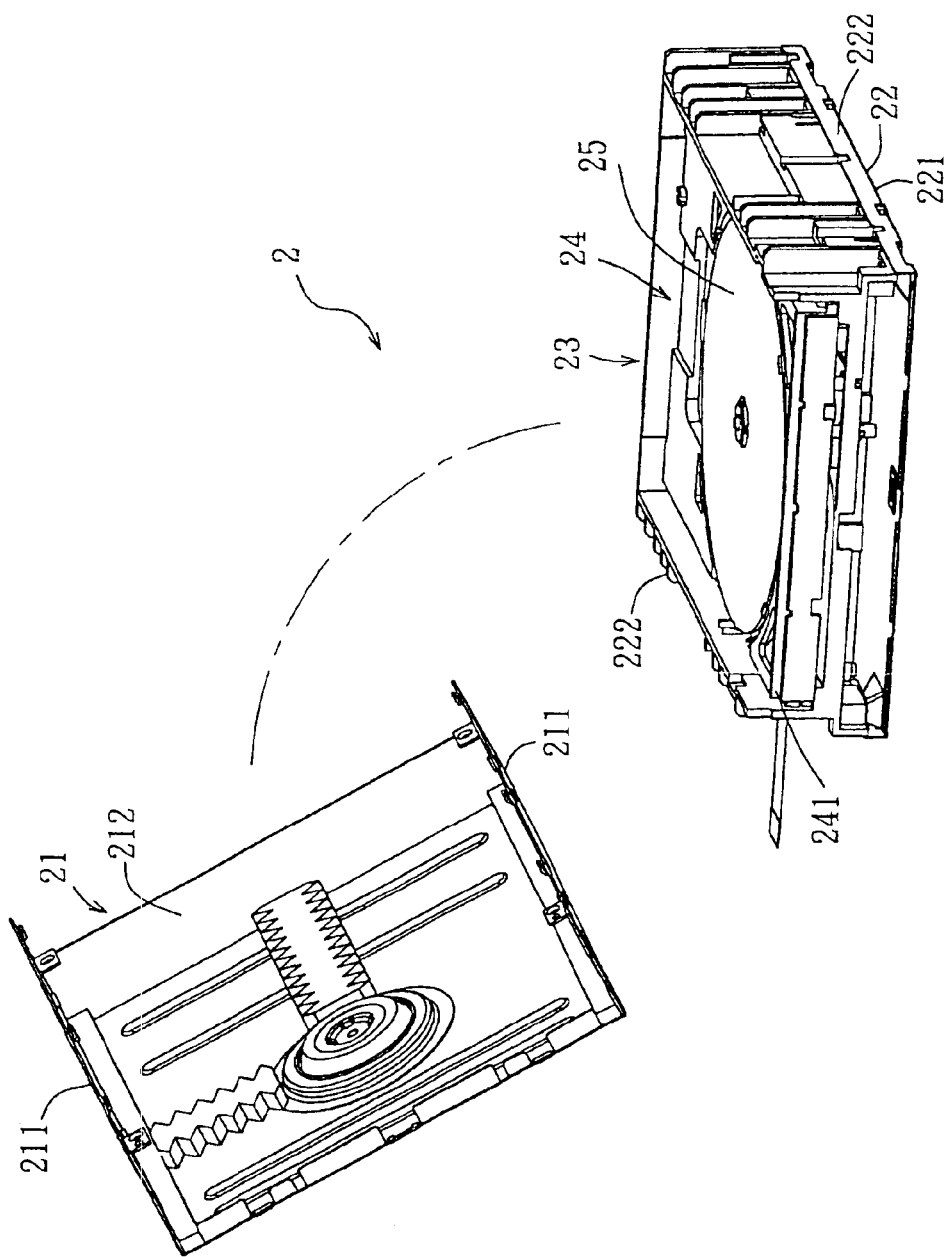
FIG. 3 is a structural diagram of a low noise CD ROM drive according to a first embodiment of the present invention.
Figure 4:
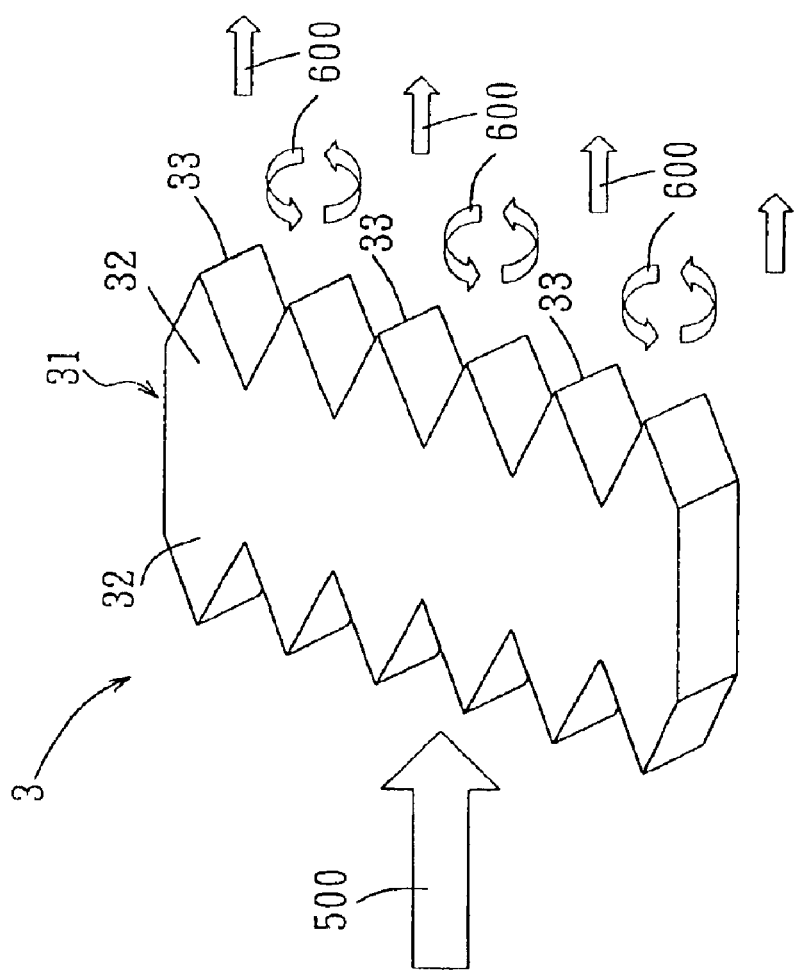
FIG. 4 is a structural diagram of the noise absorbing device of FIG. 3 and showing the state of the noise absorbing device when dividing the air currents.

Referring to FIG. 3 and FIG. 4, the low noise CD ROM drive 2 according to a first embodiment of the present invention comprises a top cover a bottom base 22 coupled to the top cover 21, a playing mechanism 23, and a noise absorbing device 3.

The top cover 21 has a rectangular shape and comprises two flank walls 211 respectively extending from two opposite sides. The bottom base 22 comprises a bottom wall 221 and three sidewalls 222 extending from the edges of the bottom wall 221. The two flank walls 211 of the top cover 21 are buckled with the two opposite sidewalls 22 of the bottom base 22 so as to define a containing space 24 with an access end 241.

The playing mechanism 23 is assembled in the containing space 24 sealing the access end 241, and is capable of being drawn out for holding a disk 25 so as to read and/or write data. When the playing mechanism 23 is holding the disk 25 for performing the data transformation and in an operation state, a high rotation rate of the disk 25 causes a main air current 500 and therefore produces noise.

The noise absorbing device 3 is formed of a high polymer foaming material, such as a rubber foaming material or a polyurethane foaming material, and is stuck on a bottom surface 212 of the top cover 21 opposite to the playing mechanism 23 for filling the gap between the top cover 21 and the playing mechanism 23. The noise absorbing device 3 comprises a dividing strip 31 extending from the bottom surface 212 to the containing space 24, and each dividing strip 31 comprises two dividing portions 32 positioned in opposite directions. Each dividing portion 32 comprises a plurality of protruding teeth 33 spaced at intervals and protruding to the containing space 24. Because each protruding tooth 33 has a profile of triangle, each dividing portion 32 has a saw-toothed shape.

When the playing mechanism 23 is holding the disk 25 for performing data transformation and in the operation state, the material forming the noise absorbing device 3 is used to absorb noise produced from the operation of the playing mechanism 23 so as to avoid noise spreading out the CD ROM drive 2. Simultaneously, when the main air current 500 caused by the rotation of disk 25 flows through the noise absorbing device 3, it is divided into a plurality of sub air currents 600 by the protruding teeth 33. Because each sub air current 600 flows in different directions and wind shears caused by the sub air currents 600 cancel out, noise produced from the main air current 500 can be substantially reduced.

Figure 5:
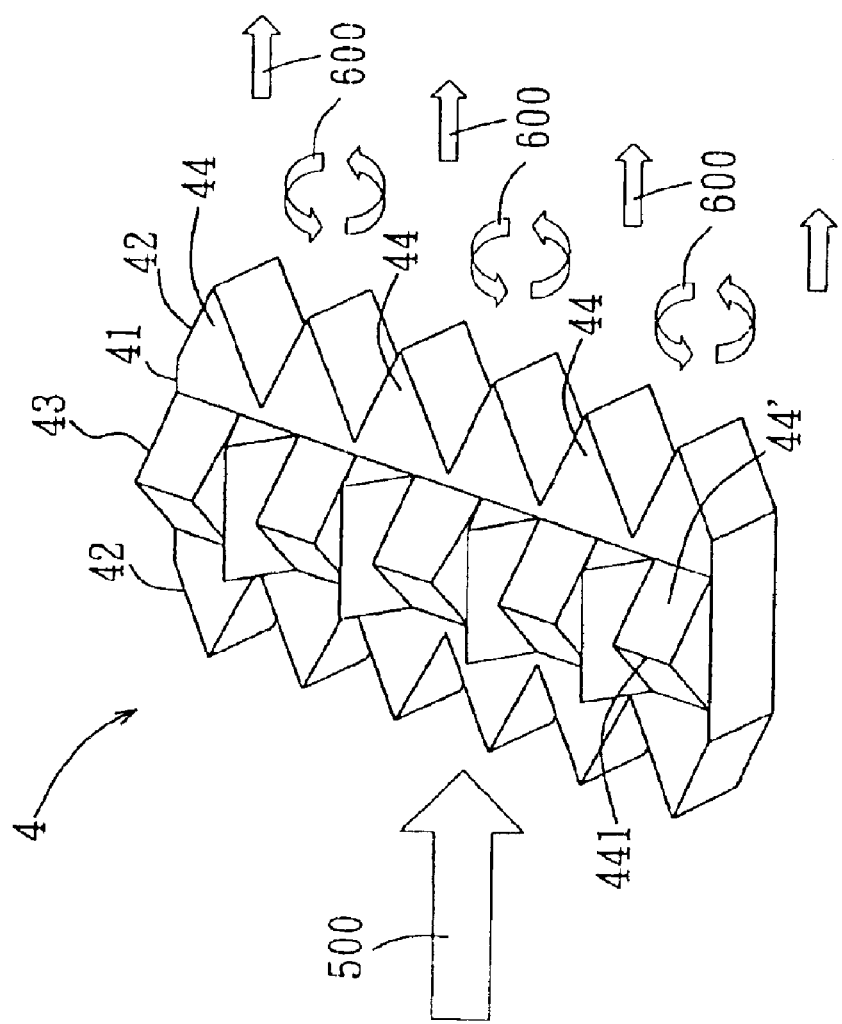
FIG. 5 is a structural diagram of the noise absorbing device according to a second embodiment of the present invention and showing the state of the noise absorbing device when dividing the air currents.

Referring to FIG. 5 together with FIG. 3, a low noise CD ROM drive according to a second embodiment of the present invention is shown, which is similar to the low noise CD ROM drive of the first embodiment. The difference between the CD ROM drive of the first embodiment and the second embodiment is the noise absorbing device 4, and the following description goes into particulars about the noise absorbing device 4.

The noise absorbing device 4 is formed of a high polymer foaming material, such as a rubber foaming material or a polyurethane foaming material, and is stuck on a bottom surface 212 of the top cover 21 opposite to the playing mechanism 23. The noise absorbing device 4 comprises a dividing strip 41 extending from the bottom surface 212 downward to the containing space 24, and each dividing strip 41 comprises two dividing portions 42, which are parallel to the bottom surface 212 and positioned in opposite directions, and one protruding dividing portion 43, which is perpendicular to the dividing portions 42 and protruding toward the containing space 24. Each dividing portion 42 comprises a plurality of protruding teeth 44 spaced at intervals and protruding to the containing space 24. Because each protruding tooth 44 has a profile of triangle, each dividing portion 42 has a saw-toothed shape. Similar to the dividing portion 42, the protruding dividing portion 43 comprises a plurality of protruding teeth 44" spaced at intervals and protruding to the containing space 24. Because each protruding tooth 44" has a profile of triangle, each protruding dividing portion 43 has a saw-toothed shape.

When the playing mechanism 23 is holding the disk 25 for performing data transformation and is in the operation state, the material forming the noise absorbing device 4 is used to absorb noise produced from the operation of the playing mechanism 23 so as to avoid noise spreading out from the CD ROM drive 2. Furthermore, a tip 441 of each protruding tooth 44" of the protruding dividing portion 43 is close to the playing mechanism 23 for directly absorbing mechanical noise generated by the playing mechanism 23. That is, mechanical noise of the CD ROM drive 2 can be substantially reduced. Simultaneously, when the main current 500 caused by the rotation of disk 25 flows through the noise absorbing device 4, it is divided into a plurality of sub air currents 600 by the protruding teeth 44, 44" of the dividing portions 42 and the protruding dividing portion 43. Because each sub air current 600 flows in different directions and wind shears caused by the sub air currents 600 cancel out, noise produced from the main air current 500 can be substantially reduced.

Please refer to FIG. 6. FIG. 6 is a table of experimental data indicating the noise level of comparing the low noise CD ROM drive 2 of the present invention with the prior art CD ROM drive (MS-8152 52x). The top measured noise level decreases from 50.2 decibels of the prior art CD ROM drive to 48.1 decibels of the low noise CD ROM drive 2. The front measured noise level decreases from 48.4 decibels of the prior art CD ROM drive to 46.5 decibels of the low noise CD ROM drive 2. The rear measured noise level decreases from 50.0 decibels of the prior art CD ROM drive to 48.3 decibels of the low noise CD ROM drive 2. Additionally, according to the equation of calculating noise decibel: $dB=20*\log(P/P_{ref})$, wherein P is sound pressure level, and $P_{ref}$ is reference sound pressure, the low noise CD ROM drive 2 of the present invention has an exponential curve improvement about sound pressure level comparing with the prior art CD ROM drive.

In other embodiments, the noise absorbing device 3, 4 of the CD ROM drive 2 may comprise a plurality of dividing strips 31, 41 spaced at intervals for dividing the main air currents 500 more finely so as to reduce noise due to air currents. Furthermore, the noise absorbing device 3, 4 maybe formed by punching the top cover 21 toward the playing mechanism 23 for decreasing process steps. After forming the noise absorbing device 3, 4, sound absorbing materials or sound isolating materials are filled to reduce mechanical noise produced from the operation of the playing mechanism 23. The noise absorbing device 3, 4 may also have a saw-toothed shape or wavy shape of single surface or multi surfaces, and the protruding teeth 44, 44" may be formed as triangle cones, tetragonal cones, or have profiles of quadrangles, polygons, arcs etc. for dividing the main air current 500 into a plurality of sub air currents 600 more smoothly. Consequently, noise produced from the main air currents 500 can be substantially reduced.

The low noise CD ROM drive 2 of the present invention uses the material forming the noise absorbing device 3, 4 to absorb mechanical noise produced from the operation of the playing mechanism 23. As well, a plurality of protruding teeth 44" of the noise absorbing device 4 is close to the playing mechanism 23 for directly absorbing mechanical noise generated by the playing mechanism 23, and mechanical noise of the CD ROM drive 2 is therefore substantially reduced. Simultaneously, when the main air current 500 caused by the rotation of disk 25 flows through the noise absorbing device 3, 4, it is divided into a plurality of sub air currents 600 by the noise absorbing device 3, 4. Because each sub air current 600 flows in different directions and wind shears caused by the sub air currents 600 cancel out, noise produced from the main air current 500 can be substantially reduced. Consequently, the low noise CD ROM drive 2 of the present invention is capable of improving the problem of mechanical noise and noise due to air currents.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A low noise optical disk drive comprising:

a top cover;

a bottom base, and a containing space being defined between the top cover and the bottom base;

a playing mechanism assembled in the containing space and capable of being drawn out for holding a disk, wherein when the playing mechanism is holding the disk in an operating state, the rotation of the disk generates a main air current within the containing space and therefore produces noise; and a noise absorbing device installed in the containing space on a bottom surface of the top, cover opposite the playing mechanism for absorbing the noise produced from the main air current, the noise absorbing device comprising a plurality of triangular-shaped protruding teeth spaced at intervals and protruding into the containing space;

wherein when the main air current flows through the noise absorbing device, the main air current is divided into a plurality of air currents of different directions by the protruding teeth so as to reduce the noise.

2. The low noise optical disk drive of claim 1, wherein the noise absorbing device is formed of a high polymer foaming material so as to absorb the mechanical noise and the noise due to air currents.

3. The low noise optical disk drive of claim 1, wherein a portion of the protruding teeth extend towards the playing mechanism and have tips close to the playing mechanism so as to absorb the mechanical noise when the playing mechanism is in the operating state.

4. A low noise optical disk drive comprising:

a top cover;

a bottom base, and a containing space being defined between the top cover and the bottom base;

a playing mechanism assembled in the containing space and capable of being drawn out for holding a disk, wherein when the playing mechanism is holding the disk in an operating state, the rotation of the disk generates a main air current within the containing space and therefore produces noise; and a noise absorbing device installed in the containing space on a bottom surface of the top cover opposite the playing mechanism for absorbing the noise produced from the main air current, the noise absorbing device comprising a plurality of triangular-prism-shaped protruding teeth spaced at intervals and protruding into the containing space;

wherein when the main air current flows through the noise absorbing device, the main air current is divided into a plurality of air currents of different directions by the protruding teeth so as to reduce the noise.

5. The low noise optical disk drive of claim 4, wherein the noise absorbing device is formed of a high polymer foaming material so as to absorb the mechanical noise and the noise due to air currents.

6. The low noise optical disk drive of claim 4, wherein a of the protruding teeth extend towards the playing mechanism and have tips close to the playing mechanism so as to absorb the mechanical noise when the playing mechanism is in the operating state.

* * * * *